United States Patent Office 3,740,399
Patented June 19, 1973

3,740,399
DIAMINO-s-TRIAZINES
Satoshi Murai, Yokaichi, Koichi Yoshida, Takatsuki, and Chikanori Tomioka, Kyoto, Japan, assignors to Kakenyaku Kako Kabushiki Kaisha, Tokyo-to, Japan
No Drawing. Filed Feb. 10, 1971, Ser. No. 114,383
Claims priority, application Japan, May 13, 1970, 45/40,664
Int. Cl. C07d 55/20
U.S. Cl. 260—249.8                    14 Claims

ABSTRACT OF THE DISCLOSURE

There are disclosed novel S-triazine derivatives and salts thereof. They can be used as therapeutices having activity as antiphlogistics, blood vessel expanders, nervous system sedatives, antivirals, antispasmodics, blood sugar reducers and diuretics. They are prepared by the reaction of a substituted diguanide or salt thereof with a carboxylic acid ester.

DETAILED EXPLANATION OF THE INVENTION

This invention relates to novel S-triazine derivatives which are expressed by the following general formula:

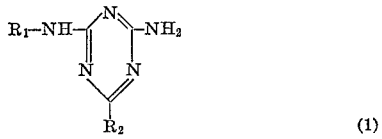

(1)

(wherein $R_1$ is a member selected from the group consisting of a substituted or unsubstituted alkyl radical, aryl radical, cycloalkyl radical, or heterocyclic residue and $R_2$ is a member selected from the group consisting of a hydrogen atom, a hydroxyl radical, carboxyl radical, substituted or unsubstituted alkyl radical, aryl radical, cycloalkyl radical or heterocyclic residue) and their salts, and also relates to a process for producing S-triazine derivatives and their salts by reacting a substituted diguanidine of general formula:

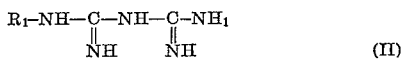

(II)

(wherein $R_1$ is the same as above mentioned) or its salt and a carboxylic acid ester of the following general formula:

(III)

(wherein $R_3$ is hydrogen atom, alkoxycarbonyl radical, substituted or unsubstituted alkyl radical, aryl radical, cycloalkyl radical or heterocyclic residue and $R_4$ is a lower alkyl radical) in the presence of a basic substance.

The compounds according to the invention are useful as medicines possessing a broad range of bioactivities such as antiphlogistic, blood vessel expansson, sedative action on the central nervous system, antiviral, antispasmodic, blood sugar reductive, diuretic, and adrenal cortex hormone secretion effect etc. for the benefit of birds and mammals including mankind.

The compounds shown in the general Formulae II and III, which are used for the preparation of the compounds of general Formula I can be obtained at a cheap price and in a large quantity and the yields on their reaction are so excellent that the compounds according to the invention are commercially attractive.

The salt of the substituted diguanide which is expressed by the general Formula II can be easily obtained by the reaction of a primary amino salt, for example its hydrochloride and dicyandiamide by heating without using a solvent or with suitable solvents such as water, alcohol, etc. The substituted diguanide salt which is produced by the above method need not be used in purified form but can be used as prepared for the following reactions. When the free compound is needed, it can be prepared by a conventional method.

Examples of substituted diguanides of the general Formula II which are suitable for producing a triazine within the range of the general Formula I are as follows: Phenyldiguanide, p-tolyldiguanide, o-tolyldiguanide, m-tolyldiguanide, 2,4 - xylyldiguanide, p-ethylphenyldiguanide, p-chlorophenyldiguanide, p-fluorophenyldiguanide, p-bromophenyldiguanide, p-iodophenyldiguanide, 2,5 - dichlorophenyldiguanide, o-sulfhydrylphenyldiguanide, m-trifluoromethylphenyl-diguanide, 2,5 - diethoxyphenyldiguanide, 2,5 - dimethoxyphenyldiguanide, α-naphthyldiguanide, β-naphthyldiguanide, p-nitrophenyldiguanide, benzyldiguanide, phenethyldiguanide, p-isopropylbenzyldiguanide, methyldiguanide, ethyldiguanide, n-butyldiguanide, n-hexyldiguanide, n-dodecyldiguanide, n-octadecyldiguanide, cyclohexyldiguanide, cyclopentyldiguanide, 5 - isoquinolyldiguanide, 5 - chloro - 8 - isoquinolyldiguanide, 2 - methyl - 1,2,3,4-tetrahydro-8-isoquinolyldiguanide, etc.

Examples of suitable carboxylic acid esters represented by the general Formula III which can be reacted with substituted diguanides of the general Formula II or their salts for the production of a triazine within the range of the general Formula I are as follows: ethyl formate, ethyl acetate, ethyl propionate, n-ethyl butyrate, ethyl isobutyrate, ethyl benzoate, ethyl toluylate, ethyl chloroacetate, ethyl bromoacetate, methyl p-isobutylphenylacetate, methyl 2-(p-isobutylphenyl)-propionate, ethyl oxalate, ethyl trichloroethylacetate, ethyl nicotinate, ethyl isonicotinate, methyl cyclohexancarboxylate, ethyl cyclohexylacetate and other alkyl esters.

A sodium alcoholate in which the alcohol is a lower aliphatic alcohol is especially advantageous among the basic materials which may be used for the reaction between a substituted diguanide of the general Formula II or its salt and a carboxylic acid ester of the general Formula III. Any kind of solvent can be used for the above reaction, if it does not interfere therewith, but a lower aliphatic alcohol is especially preferred and mixtures of a lower aliphatic alcohol and various other organic solvents are also recommended. The reaction is usually run at room temperature, but it can be done by cooling or heating, if necessary. A reaction time of several hours to some seventy hours is necessary for the completion of the reaction and an expected compound can be obtained in a high yield by the process of this invention.

Triazines of the general Formula I produced according to the process of this invention can be used in a form of free base or its salt which is produced by reacting the free base and various acids. The acids used for this purpose, for example, are hydrochloric acid, hydro-bromic acid, sulfuric acid, nitric acid, phosphoric acid, perchloric acid, formic acid, acetic acid, propionic acid, oxalic acid, succinic acid, glycolic acid, nicotinic acid, tartaric acid, maleic acid, malic acid, lactic acid, pamoic acid, citric acid, ascorbic acid, methansulfonic acid, salicylic acid, benzoic acid, cyclohexanesulfamic acid or other similar acids which are adaptable to the manufacture of medicines.

This invention is illustrated by the following examples, it being clearly understood that the scope of this invention shall not be limited thereby.

(1) 179.7 grams of α-naphthylamine hydrochloride and 84 grams of dicyandiamide are dissolved in 400 ml. of water and the solution is refluxed for 1 hour. Precipitated α-naphthyldiguanide hydrochloride after cooling is collected by filtration and washed with water and dried. 13.2 grams of α-naphthyldiguanide hydrochloride are added to a solution containing 1.2 grams of metallic sodium dissolved in 70 ml. of methanol and the mixture is sufficiently stirred. Further 3.7 grams of ethyl formate are added to the solution, which is left as it is at room temperature for 48 hours. The reaction solution is allowed to cool after the addition of water. The resulting crystalline precipitate is collected by filtration and recrystallized with a mixed solvent of ethanol and water. Thus 8.5 grams of 2-amino-4-(α-naphthylamino)-1,3,5-triazine with melting point of 248–249° C. are obtained.

Elementary analysis of $C_{13}H_{11}N_5$.—Theoretical value (percent): C, 65.81; H, 4.67; N, 29.52. Experimental value (percent): C, 65.90; H, 4.66; N, 29.31.

When the above-mentioned 2-amino-4-(α-naphthylamino)-1,3,5-triazine is recrystallized from a solution of hydrochloric acid, the monohydrochloride is obtained.

Elementary analysis of $C_{13}H_{12}N_5Cl$.—Theoretical value (percent): C, 57.04; H, 4.42; N, 25.59; Cl, 12.95. Experimental value (percent): C, 57.31; H, 4.35; N, 25.57; Cl, 12.78.

(2) 13.2 grams of α-naphthyldiguanide hydrochloride are added to a solution containing 1.2 grams of metallic sodium dissolved in 70 ml. of methanol and the mixture is sufficiently stirred. Further 4.4 grams of ethyl acetate are added to the solution, which is left as it is at room temperature for 48 hours. The reaction solution is allowed to cool after the addition of water. The resulting crystalline precipitate is collected by filtration and recrystallized from a mixed solvent of ethanol and water. Thus 8.8 grams of 2-amino-4-(α-naphthylamino)-6-methyl-1,3,5-triazine with melting point of 185–186° C. are obtained.

Elementary analysis of $C_{14}H_{13}N_5$.—Theoretical value (percent): C, 66.92; H, 5.21; N, 27.87. Experimental value (percent): C, 66.90; H, 4.98; N, 27.99.

When the above mentioned 2-amino-4-(α-naphthylamino)-6-methyl-1,3,5-triazine is recrystallized from a solution of hydrochloric acid, the monohydrochloride is obtained.

Elementary analysis of $C_{14}H_{14}N_5Cl$.—Theoretical value (percent): C, 58.44; H, 4.90; N, 24.34; Cl, 12.32. Experimental value (percent): C, 58.61; H, 4.77; N, 24.30; Cl, 12.20.

(3) A solution containing 1.5 grams of metallic sodium dissolved in 25 ml. of methanol is poured into a solution containing 13.2 grams of α-naphthyldiguanide hydrochloride dissolved in 50 ml. of methanol at room temperature. Further 5.1 grams of ethyl porpionate are added to the solution, which is left as it is at room temperature for 72 hours after sufficient stirring. The reaction solution is allowed to cool after the addition of water. The resulting crystalline precipitate is collected by filtration and recrystallized from n-butanol. Thus 9.7 grams of 2-amino-4-(α-naphthylamino)-6-ethyl-1,3,5-triazine with melting point of 209–210° C. is obtained.

Elementary analysis of $C_{15}H_{15}N_5$.—Theoretical value (percent): C, 67.90; H, 5.70; N, 26.40. Experimental value (percent): C, 68.14; H, 5.77; N, 26.29.

(4) A solution containing 2.5 grams of metallic sodium dissolved into 25 ml. of methanol is poured into a solution containing 13.2 grams of β-naphthyldiguanide hydrochloride dissolved in 50 ml. of methanol at room temperature. Further 6.8 grams of methylbenzoate added to this solution and the mixture is refluxed for 5 hours. After it is left as it is for 24 hours, water is added until a precipitate is not deposited from the reaction solution and it is further left as it is for 24 hours. The resulting precipitate is collected by filtration, and recrystallized from n-butanol to obtain 9.5 grams of 2-amino-4-(β-naphthylamino) - 6 - phenyl - 1,3,5 - triazine with melting point of 164–165° C.

Elementary analysis of $C_{19}H_{15}N_5$.—Theoretical value (percent): C, 72.83; H, 4.83; N, 22.35. Experimental value (percent): C, 72.59; H, 4.82; N, 22.37.

When ethanol containing 1 equivalent of hydrochloric acid is added to an ethanol solution containing the above-mentioned 2 - amino-4-(β-naphthylamino)-6-phenyl-1,3,5-triazine, the monohydrochloride is obtained. When 1 equivalent of acetylsalicylic acid is used in the same way, the monoacetylsalicylic addition salt is obtained.

(5) A solution containing 1.5 grams of metallic sodium dissolved 25 ml. of methanol is poured into a solution containing 13.2 grams of β-naphthyldiguanide hydrochloride dissolved in 50 ml. of methanol at room temperature. Further 11.0 grams of ethyl p-isobutylphenyl acetate are added to this solution and the mixture is left as it is at room temperature for 72 hours after sufficient stirring. Water is added until a precipitate is not deposited from the reaction solution and it is further left as it is for 24 hours. By collecting the precipitate by filtration and recrystallizing from a mixed solution of ethanol and water, 14.5 grams of 2-amino-4-(β-naphthylamino)-6-(p-isobutylbenzyl)-1,3,5-triazine with melting point of 178–179° C. are obtained.

Elementary analysis of $C_{24}H_{25}N_5$.—Theoretical value (percent): C, 75.17; H, 6.57; N, 18.26. Experimental value (percent): C, 75.18; H, 6.86; N, 18.10.

(6) 25.0 grams of m-aminobenzotrifluoride and 13 grams of dicyandiamide are dissolved into 62 ml. of 10% hydrochloric acid and the solution is refluxed for 1 hour. Precipitated m-trifluoromethylphenyldiguanide hydrochloride after cooling is collected by filtration and washed with water and dried.

14.1 grams of m-trifluoromethylphenyldiguanide hydrochloride are added to a solution containing 1.2 grams of metallic sodium dissolved in 70 ml. of methanol and the mixture is sufficiently stirred. Further 11.0 grams of ethyl p-isobutylphenylacetate added to the solution, which is left as it is at room temperature for 72 hours. Twice the volume of water is added to the reaction solution, which is allowed to cool. The resulting crystalline precipitate is collected by filtration and recrystallized with a mixed solvent of ethanol and water. Thus 11.6 grams of 2-amino - 4 - (m-trifluoromethylanilino)-6-(p-isobutylbenzyl)-1,3,5-triazine are obtained.

Elementary analysis of $C_{21}H_{22}N_5F_3$.—Theoretical value (percent): C, 62.83; H, 5.52; N, 17.45. Experimental value (percent): C, 62.71; H, 5.50; N, 17.39.

(7) A solution containing 1.5 grams of metallic sodium dissolved into 22 ml. of methanol is poured into a solution containing 14.1 grams of m-trifluoromethylphenyldiguanide hydrochloride dissolved in 50 ml. of methanol. Further 7.6 grams of ethyl isonicotinate are added to this solution and the mixture is left as it is at room temperature for 72 hours. After addition of 200 ml. of water to the reaction solution, it is left as it is for 24 hours. The resulting crystalline precipitate is collected by filtration and recrystallized with a mixed solvent of ethanol and water. Thus 10.9 grams of 2-amino-4-(m-trifluoromethylanilino)-6-(4-pyridyl)-1,3,5-triazine with melting point of 229–230° C. are obtained.

Elementary analysis of $C_{15}H_{11}N_6F_3$.—Theoretical value (percent): C, 54.22; H, 3.34; N, 25.29. Experimental value (percent): C, 54.32; H, 3.11; N, 25.29.

(8) 34 grams of dicyandiamide and 36 ml. of concentrated hydrochloric acid are added to a solution containing 58 grams of 5-aminoisoquinoline dissolved in 160 ml. of isopropanol and the mixture is refluxed for 1.5 hours. Precipitated 5-isoquinolyldiguanide hydrochloride after cooling is collected by filtration and dried after washing with a small quantity of ethanol. 3.8 grams of 5-isoquinolyldiguanide dihydrochloride are added to a solution containing 0.58 gram of metallic sodium dissolved in 25 ml. of absolute methanol and further 0.95 gram of ethyl formate is added and the mixture is sufficiently stirred. After being left as it is at room temperature for 48 hours, the reaction solution is further left as it is with an addition of water for 24 hours.

The resulting crystalline precipitate is collected by filtration and recrystallized from a mixed solvent of ethanol and water. Thus, 1.7 grams of 2-amino-4-(5-isoquinolylamino)-1,3,5-triazine with melting point of 259–260° C. are obtained.

Elementary analysis of $C_{12}H_{10}N_6$.—Theoretical value (percent): C, 60.50; H, 4.23; N, 35.27. Experimental value (percent): C, 60.72; H, 4.20; N, 35.03.

(9) 4.2 grams of 5-chloro-8-isoquinolyldiguanide dihydrochloride are added to a solution containing 0.58 gram of metallic sodium dissolved in 25 ml. of absolute methanol and further 2.75 grams of ethyl p-isobutylphenylacetate are added. The mixture is sufficiently stirred. After being left as it is at room temperature for 48 hours, the reaction solution is further left as it is with an addition of water for 24 hours. The precipitated crystals are collected by filtration and recrystallized from a mixed solvent of ethanol and water. Thus, 4.1 grams of 2-amino-4-(5-chloro - 8 - isoquinolylamino) - 6 - (p-isobutylbenzyl)-1,3,5-triazine having melting point of 126–127° C. obtained.

Elementary analysis of $C_{23}H_{23}N_6Cl$.—Theoretical value (percent): C, 65.94; H, 5.53; N, 20.06; Cl, 8.46. Experimental value (percent): C, 65.84; H, 5.78; N, 20.07; Cl, 8.16.

(10) 10.7 grams of phenyldiguanide hydrochloride added to a solution in which 1.2 grams of metallic sodium has been dissolved into 70 ml. of methanol, and further 8.2 grams of ethyl p-toluylate added, and the mixture is sufficiently stirred. After being left as it is at room temperature for 48 hours, the reaction solution is added with water and allowed to cool. The precipitated crystals are collected by filtration and recrystallized from n-butanol, thus obtaining 11.0 grams of 2-amino-4-anilino-6-(p-tolyl)-1,3,5-triazine having melting point of 199–200° C.

Elementary analysis of $C_{16}H_{15}N_5$.—Theoretical value (percent): C, 69.29; H, 5.45; N, 25.25. Experimental value (percent): C, 69.30; H, 5.55; N, 25.27.

(11) 11.4 grams of p-tolyldiguanide hydrochloride are added to a solution in which 1.5 grams of metallic sodium have been dissolved in 70 ml. of methanol, and further 7.6 grams of ethyl isonicotinate are added. The mixture is sufficiently stirred. After being left as it is at room temperature for 48 hours, the reaction solution is added with water and allowed to cool. The precipitated crystals are collected by filtration and recrystallized from n-butanol. Thus, 10.0 grams of 2-amino-4-(p-toluidino)-6-(4-pyridyl)-1,3,5-triazine having melting point of 236–237° C. are obtained.

Elementary analysis of $C_{15}H_{14}N_6$.—Theoretical value (percent): C, 64.73; H, 5.07; N, 30.20. Experimental value (percent): C, 65.00; H, 4.85; N, 30.17.

(12) 11.4 grams of o-tolyldiguanide hydrochloride are added to a solution in which 1.5 grams of metallic sodium have been dissolved in 70 ml. of methanol, and further 11.7 grams of ethyl 2-(p-isobutylphenyl) propionate are added, and thereafter stirred sufficiently. After being left as it is at room temperature for 72 hours, water is added to the reaction solution and allowed to cool. Then, the precipitated crystals are collected by filtration, and recrystallized from a mixed solvent of ethanol and water. Thus, 14.3 grams of 2 - amino - 4 - (o-toluidino)-6-(p-isobutyl-α-methyl benzyl)-1,3,5-triazine having melting point of 132–134° C. are obtained.

Elementary analysis of $C_{22}H_{27}N_5$.—Theoretical value (percent): C, 73.10; H, 7.53; N, 19.37. Experimental value (percent): C, 73.03; H, 7.48; N, 19.57.

(13) 11.4 grams of m-tolyldiguanide hydrochloride are added to a solution in which 1.5 grams of metallic sodium have been dissolved in 70 ml. of methanol, and futher 7.6 grams of ethyl nicotinate are added thereto, and stirred sufficiently. After being left as it is at room temperature for 48 hours, water is added to the reacting solution and allowed to cool. By collecting by filtration the crystals precipitated therein and recrystallizing from n-butanol, 10.9 grams of 2-amino-4-(m-toluidino)-6-(3-pyridyl)-1,2,3,5-triazine having melting point of 216–218° C. are obtained.

Elementary analysis of $C_{15}H_{14}N_6$.—Theoretical value (percent): C, 64.73; H, 5.07; N, 30.20. Experimental value (percent): C, 64.70; H, 5.27; N, 30.15.

(14) 34.5 grams of cyclohexylamine hydrochloride and 21.5 grams of dicyandiamide are ground uniformly. The mixture is melted on an oil bath at 150–160° C., and maintained at this temperature for about 30 minutes. After being cooled, it is dissolved in hot methanol and cooled, and cyclohexyldiguanide hydrochloride is precipitated.

11.0 grams of cyclohexyldiguanide hydrochloride are added to a solution in which 1.2 grams of metallic sodium have been dissolved in 40 ml. of methanol, and further 5.2 grams of ethyl propionate are added thereto, and stirred sufficiently. After being left as it is at room temperature for 72 hours, twice the volume of water is added to the reaction solution to cause white colored crystals to precipitate. The precipitated crystals are collected by filtration, and thereafter recrystallized from mixed solvent of ethanol and water, and 8.4 grams of 2-amino-4-cyclohexylamino-6-ethyl-1,3,5-triazine having melting point of 147–149° C. are obtained.

Elementary analysis of $C_{11}H_{18}N_5$.—Theoretical value (percent): C, 59.97; H, 8.24; N, 31.79. Experimental value (percent): C, 60.28; H, 8.21; N, 31.81.

(15) A solution in which 1.5 grams of metallic sodium have been dissolved into 22 ml. of methanol, is added to a solution in which 11.0 grams of cyclohexyldiguanide hydrochloride have been dissolved in 40 ml. of methanol. Further, 8.2 grams of ethyl p-toluylate are added to this solution, and stirred sufficiently. After being left as it is at room temperature for 72 hours, twice the volume of water is added to the reaction solution to cause the precipitation of crystals. The filtered crystals are recrystallized from a mixed solvent of ethanol and water and 8.2 grams of 2 - amino - 4-cyclohexylamino-6-(p-tolyl)-1,3,5-triazine having melting point of 152.5–153.5° C. are obtained.

Elementary analysis of $C_{16}H_{20}N_5$.—Theoretical value (percent): C, 68.06; H, 7.14; N, 24.08. Experimental value (percent): C, 67.86; H, 6.89; N, 25.09.

(16) 80.5 grams of p-fluoroaniline and 61.2 grams of dicyandiamide are dissolved in 290 ml. of 10% hydrochloric acid solution and the solution refluxed for one hour. After cooling, the precipitated p-fluorophenyldiguanide hydrochloride is collected by filtration and dried. 11.5 grams of p-fluorophenyldiguanide hydrochloride are added to a solution in which 1.5 grams of metallic sodium have been dissolved in 70 ml. of methanol, and further 5.2 grams of ethyl propionate are added and stirred sufficiently. After being left as it is at room temperature for 72 hours, twice the volume of water is added to the reaction solution, and allowed to cool. The precipitated crystals are collected by filtration, and upon recrystallization from n-butanol, 8.3 grams of 2-amino-4-(p-fluoroanilino)-6-ethyl-1,3,5-triazine having melting point of 160–161° C. are obtained.

Elementary analysis of $C_{11}H_{12}N_5F$.—Theoretical value (percent): C, 56.64; H, 5.19; N, 30.03. Experimental value (percent): C, 56.49; H, 4.96; H, 30.00.

(17) 17.0 grams of p-iodophenyldiguanide hydrochloride are added to a solution in which 1.5 grams of metallic sodium have been dissolved into 70 ml. of methanol, and 4.4 grams of ethyl acetate is further added, and sufficiently stirred. After being left as it is at room temperature for 48 hours, twice the volume of water is added to the reaction solution, and allowed to cool. By collecting by filtration the precipitated crystals and recrystallized from n-butanol, 8.5 grams of 2-amino-4-(p-iodoanilino)-6-methyl-1, 3,5-triazine having melting point of 219–220° C. are obtained.

Elementary analysis of $C_{10}H_{10}N_5I$.—Theoretical value (percent): C, 36.72; H, 3.08; N, 21.41. Experimental value (percent): C, 36.98; H, 3.40; N, 21.40.

(18) 12.4 grams of p-chlorophenyldiguanide hydrochloride are added to a solution in which 1.2 grams of metallic sodium have been dissolved in 70 ml. of methanol, and cooled to a temperature of 0–5° C. 7.3 grams of ethyl oxalate are added to this solution, stirred sufficiently, and left as it is at room temperature for 24 hours. After collecting the precipitated crystals by filtration, they are washed with acetonitrile, and 8.8 grams of 2-amino-4-(p-chlorophenylamino) - 6-carboxyl-1,3-triazine, which decomposes at 210° C. are obtained.

Elementary analysis of $C_{10}H_8O_2N_5Cl$.—Theoretical value (percent): C, 45.21; H, 3.04; O, 12.04; N, 26.36. Experimental value (percent): C, 44.93; H, 3.21; O, 11.82; N, 26.58.

(19) 13.2 grams of β-naphthyldiguanide hydrochloride are added to a solution in which 1.2 grams of metallic sodium have been dissolved in 120 ml. of methanol, and cooled to 0–5° C. 7.3 grams of ethyl oxalate are added to this solution and left as it is at room temperature for 24 hours. The precipitated crystals are collected by filtration, and thereafter washed by acetonitrile. 9.9 grams of 2-amino - 4 - (β-naphthylamino)-6-carboxyl-1,3,5-triazine which decompose at 210–213° C. are obtained.

Elementary analysis of $C_{14}H_{11}C_2N_5$.—Theoretical value (percent): C, 59.78; H, 3.94; N, 24.90. Experimental value (percent): C, 60.07; H, 3.94; N, 24.75.

(20) 12.3 grams of o-mercaptophenyldiguanide hydrochloride are added to a solution in which 1.2 grams of metallic sodium have been dissolved in 70 ml. of methanol, and further 3.7 grams of ethyl formate are added thereto, and the solution is stirred sufficiently. After the solution has been left as it is at room temperature for 48 hours, water is added to the reaction solution and cooled. The precipitated crystals are filtered, and recrystallized from a mixed solvent of ethanol and water, and 7.2 grams of 2 - amino-4-(o-mercaptoanilino)-1,3,5-triazine having melting point of 138–140° C. are obtained.

(21) 23 grams of o-mercaptophenyldiguanide hydrochloride are added to a solution in which 2.3 grams of metallic sodium have been dissolved in 75 ml. of methanol, and further 14 grams of ethyl benzoate are added and stirred sufficiently.

After being left as it is at room temperature for 72 hours, water is added to the reaction solution, and left as it is for 24 hours. The precipitated crystals are collected by filtration, and recrystallized from a mixed solvent of ethanol and water, and 13.6 grams of 2-amino-4-(o-mercaptoanilino)-6-phenyl-1,3,5-triazine having melting point of 168–169° C. are obtained.

(22) A solution in which 1.5 grams of metallic sodium has been dissolved in 20 ml. of methanol, is added to a suspension of 12.4 grams of p-chlorophenyldiguanide hydrochloride in 50 ml. of methanol, and stirred sufficiently. Further, 7.6 grams of ethyl nicotinate are added, and left as it is at room temperature for 72 hours. Water is added to the reaction solution, and thereafter the precipitated crystals are filtered, and recrystallized from n-butanol to obtain 8.3 grams of 2 - amino-4-(p-chloroanilino)-6-(3-pyridyl)-1,3,5-triazine having melting point of 223–24° C.

Elementary analysis of $C_{14}H_{11}N_6Cl$.—Theoretical value (percent): C, 56.29; H, 3.71; N, 28.13. Experimental value (percent): C, 56.18; H, 3.66; N, 28.30.

(23) 30 ml. of ethylene glycol are added to a solution in which 1.2 grams of metallic sodium have been dissolved in 50 ml. of methanol, and further 129 grams of p-nitrophenyldiguanide hydrochloride are added. After the solution has been well mixed, 4.0 grams of ethyl formate is added and left as it is for 48 hours, and thereafter twice the volume of water is added to the reaction solution, and allowed to cool. The crystals produced therein are collected by filtration and washed with acetonitrile, and 7.9 grams of 2-amino-4-(p-nitroanilino)-1,3,5-triazine are obtained.

Elementary analysis of $C_9H_8O_2N_6$.—Theoretical value (percent): C, 46.55; H, 3.47; N, 36.19. Experimental value (percent): C, 46.86; H, 3.29; N, 36.40.

5.5 grams of the above 2-amino-4-(p-nitroanilino)-1,3,5-triazine is suspended in 75 ml. of methanol, and refluxed with the dropwise addition of time a solution in which 20 grams of stannous chloride has been dissolved in 23 ml. of concentrated hydrochloric acid. As the reaction progresses, the solution becomes transparent. After the addition has been finished, reflux is continued for 1.5 hours, and the same quantity of concentrated hydrochloric acid is added to the solution, and cooled down to 0–5° C. The precipitated crystals are collected by filtration, and washed with cold concentrated hydrochloric acid. Then, by washing with acetone and drying, 4.2 grams of 2-amino - 4-(p-aminoanilino)-1,3,5-triazine dihydrochloride are obtained.

Elementary analysis of $C_9H_{12}N_6Cl_2$.—Theoretical value (percent): C, 39.29; H, 4.40; N, 30.54. Experimental value (percent): C, 39.12; H, 4.39; N, 30.30.

(24) 30 ml. of ethylene glycol are added to a solution in which 1.2 grams of metallic sodium have been dissolved in 50 ml. of methanol, and 12.9 grams of p-nitrophenyldiguanide hydrochloride are further added. 11.7 grams of ethyl 2-(p-isobutylphenyl) propionate are added to the above solution which has been sufficiently mixed, and after the solution is left as it is at room temperature for 72 hours, twice the volume of water is added said solution, and allowed to cool.

The resulting crystals are filtered and washed with acetonitrile, then 15.0 grams of 2-amino-4-(p-nitroanilino)-6 - (p-isobutyl-α-methylbenzyl)-1,3,5-triazine which decomposes 286–289° C. are obtained.

Elementary analysis of $C_{21}H_{24}O_2N_6$.—Theoretical value (percent): C, 64.27; H, 6.16; N, 21.41. Experimental value (percent): C, 64.31; H, 6.41; N, 21.39.

To a refluxing suspension of 9.3 grams of the above mentioned 2 - amino - 4-(p-nitroanilino)-6-(p-isobutyl-α-methylbenzyl)-1,3,5-triazine in 100 ml. of methanol, there is added dropwise a solution in which 20 grams of stannous chloride have been dissolved in 23 grams of concentrated hydrochloric acid. As the reaction progresses, the solution becomes transparent. After the addition, the solution is refluxed for 2 hours, an equal volume of concentrated hydrochloric acid is added, and the solution is cooled down to 0–5° C.

The precipitated crystals are collected by filtration and washed with cold concentrated hydrochloric acid and dried. Then 8.1 grams of 2-amino-4-(p-aminoanilino)-6-(p-isobutyl - α - methylbenzyl)-1,3,5-triazine dihydrochloride are obtained.

Elementary analysis of $C_{21}H_{28}N_6Cl_2$.—Theoretical value (percent): C, 57.93; H, 6.48; N, 19.30. Experimental value (percent): C, 57.75; H, 6.24; N, 19.26.

(25) 12.4 grams of p-chlorophenyldiguanide hydrochloride added to a solution in which 1.2 grams of metallic sodium have been dissolved in 70 ml. of methanol, and sufficiently mixed. To this solution, 9.6 grams of ethyl trichloroacetate are added and refluxed in a moderate flow rate for 7 hours. After cooling, the precipitated crystals are filtered and washed with hot water and ethanol. 9.7 grams of 2-amino-4-(p-chloroanilino)-6-hydroxy-1,3,5-triazine (melting point being more than 270° C.) are obtained.

Elementary analysis of $C_9H_8OH_5Cl$.—Theoretical value (percent): C, 45.49; H, 3.39; N, 29.47. Experimental value (percent): C, 45.24; H, 3.31; N, 29.33.

(26) 50 grams of n-butylamine hydrochloride and 38.4 grams of dicyandiamide are uniformly mixed. This mixture is melted on an oil bath at a temperature of 130±5° C., and maintained at this temperature for about 4 hours. After cooling, the mixture is dissolved in hot methanol and cooled, and n-butyl-diguanide hydrochloride is precipitated. 9.7 grams of n-butyl-diguanide hydrochloride are added to a solution in which 1.5 grams of metallic sodium have been dissolved in 50 ml. of methanol, and further 11.0 grams of ethyl p-isobutylphenyl acetate are added thereto and sufficiently stirred. After being left as it is for 72 hours, twice the volume of water is added to the reaction solution. The precipitated crystals are collected by filtration and recrystallized from a mixed solvent of ethanol and water. 13.5 grams of 2-amino-4-n-butylamino-6-p-(isobutylbenzyl)-1,3,5-triazine having melting point of 99.5–101° C. are obtained.

Elementary analysis of $C_{18}H_{27}N_5$.—Theoretical value (percent): C, 68.97; H, 8.68; N, 22.34. Experimental value (percent): C, 69.17; H, 8.79; N, 22.32.

(27) 6.4 grams of ethyldiguanide are added to a solution in which 1.2 grams of metallic sodium have been dissolved in 50 ml. of methanol, and 11.0 grams of ethyl p-isobutylphenylacetate are further added and sufficiently stirred. After being left as it is at room temperature for 72 hours, twice the volume of water is added to the reaction solution and left as it is for 24 hours. The precipitated crystals are collected by filtration and recrystallized from a mixture of ethanol and water, and 10.2 grams of 2-amino-4-ethylamino - 6 - (p-isobutylbenzyl)-1,3,5-triazine having melting point of 108–111° C. are obtained.

Elementary analysis of $C_{16}H_{23}N_5$.—Theoretical value (percent): C, 67.34; H, 8.12; N, 24.54. Experimental value (percent): C, 67.18; H, 8.18; N, 24.22.

(28) A solution in which 1.2 grams of metallic sodium have been dissolved in 20 ml. of methanol is added to a solution in which 12.6 grams of p-diphenyldiguanide have been dissolved in 50 ml. of methanol. 11.7 grams of ethyl 2-(p-isobutylphenyl) propionate are added and sufficiently stirred, and thereafter left as it is for 72 hours. After 200 ml. of water have been added to the reaction solution and allowed to cool, the precipitated crystals are collected by filtration and recrystallized from a mixed solvent of ethanol and water, and 17.8 grams of 2-amino-4-(p-diphenylamino)-6-(p-isobutyl-α-methylbenzyl)-1,3,5 - triazine having melting point of 138–139° C. are obtained.

Elementary analysis of $C_{27}H_{29}N_5$.—Theoretical value (percent): C, 76.56; H, 6.90; N, 16.53. Experimental value (percent): C, 76.57; H, 7.13; N, 16.77.

Ethanol containing 1 equivalent of phosphoric acid is added to an ethanol solution of the above 2-amino-4-(p-phenylanilino) - 6 - (p-isobutyl-α-methylbenzyl)-1,3,5-triazine, and the monophosphate is obtained. By the use of 1 equivalent of benzoic acid in similar manner, the monobenzoic acid addition salt is obtained.

(29) A solution in which 1.2 grams of metallic sodium have been dissolved in 20 ml. of methanol, is added to a solution in which 11.8 grams of 2-nitro-4-methyl-phenyldiguanide have been dissolved in 50 ml. of methanol. 11.7 grams of ethyl 2-(p-isobutylphenyl) propionate are further added and mixed sufficiently. Thereafter it is left as it is for 72 hours. After 200 ml. of water has been added to the reaction solution and allowed to cool, the precipitated crystals are collected and recrystallized from n-butanol. 16.4 grams of 2-amino-4-(2-nitro-4-methyl-anilino)-6-(p-isobutyl-α-methylbenzyl) - 1,3,5 - triazine having melting point of 203–205° C. are obtained.

Elementary analysis of $C_{22}H_{26}O_2N_6$.—Theoretical value (percent): C, 65.01; H, 6.45; N, 20.68. Experimental value (percent): C, 65.00; H, 6.28; N, 20.72.

(30) 15.0 grams of 2,5-diethoxyphenyldiguanide hydrochloride are added to a solution in which 1.2 grams of metallic sodium have been dissolved in 70 ml. of methanol, and 5.8 grams of ethyl isobutyrate are further added, and mixed sufficiently. After being left as it is at room temperature for 48 hours, water is added and left as it is for 24 hours. The precipitated crystals are collected by filtration and recrystallized from a mixed solvent of ethanol and water and 11.8 grams of 2-amino-4-(2,5-diethoxy-anilino)-6-isopropyl-1,3,5-triazine having melting point of 162–163° C. are obtained.

Elementary analysis of $C_{16}H_{23}O_2N_5$.—Theoretical value (percent): C, 60.55; H, 7.30; N, 22.07. Experimental value (percent): C, 60.34; H, 7.38; N, 21.85.

What is claimed is:
1. A compound of the formula

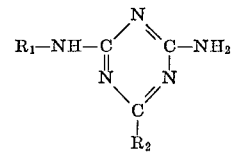

wherein $R_1$ represents phenyl substituted by fluoro, chloro, iodo, mercapto, trifluoromethyl, phenyl, ethoxy, nitro or methyl and $R_2$ represents pyridyl, an alkyl group of 1 to 3 carbon atoms, phenyl, p-isobutylbenzyl or p-isobutyl-α-methylbenzyl; or a pharmaceutically acceptable acid-addition salt thereof.

2. The compound of claim 1 which is 2-amino-4-(m-trifluoromethylanilino)-6-(p-isobutylbenzyl-1,3,5-triazine.

3. The compound of claim 1 which is 2-amino-4-(m-trifluoromethylanilino)-6-(4-pyridyl)-1,3,5-triazine.

4. The compound of claim 1 which is 2-amino-4-(p-fluoroanilino)-6-ethyl-1,3,5-triazine.

5. The compound of claim 1 which is 2-amino-4-(p-iodoanilino)-6-methyl-1,3,5-triazine.

6. The compound of claim 1 which is 2-amino-4-(o-mercaptoanilino)-6-phenyl-1,3,5-triazine.

7. The compound of claim 1 which is 2-amino-4-(p-chloroanilino)-6-(3-pyridyl)-1,3,5-triazine.

8. The compound of claim 1 which is 2-amino-4-(p-diphenylamino) - 6 - (p-isobutyl-α-methylbenzyl)-1,3,5-triazine.

9. The compound of claim 1 which is 2-amino-4-(2,5-diethoxyanilino)-6-isopropyl-1,3,5-triazine.

10. The compound of claim 1 which is 2-amino-4-(p-toluidino)-6-(4-pyridyl)-1,3,5-triazine.

11. The compound of claim 1 which is 2-amino-4-(o-toluidino)-6-(p-isobutyl-α-methylbenzyl)-1,3,5-triazine.

12. The compound of claim 1 which is 2-amino-4-(m-toluidino)-6-(3-pyridyl)-1,3,5-triazine.

13. The compound of claim 1 which is 2-amino-4-(p-nitroanilino)-6-(p-isobutyl-α-methylbenzyl)-1,3,5-triazine.

14. The compound of claim 1 which is 2-amino-4-(2-nitro - 4 - methylanilino)-6-(p-isobutyl-α-methylbenzyl)-1,3,5-triazine.

References Cited
UNITED STATES PATENTS

| | | | |
|---|---|---|---|
| 2,344,784 | 3/1944 | Oldham | 260—249.9 |
| 2,630,433 | 3/1953 | Kaiser et al. | 260—249.9 |
| 2,928,768 | 3/1960 | Freedman et al. | 260—249.9 X |
| 3,169,904 | 2/1965 | Calderbank et al. | 260—249.9 X |
| 3,471,491 | 10/1969 | Narayanan | 260—249.9 |

OTHER REFERENCES

Smolin et al.: "s-Triazines and Derivatives," Interscience Pub., Inc., New York (1959), pp. 238–9.

JOHN M. FORD, Primary Examiner

U.S. Cl. X.R.

260—249.9; 424—249